Oct. 8, 1963    B. G. S. B. BURLEIGH    3,106,182
FENDER
Filed Sept. 24, 1962    3 Sheets-Sheet 1

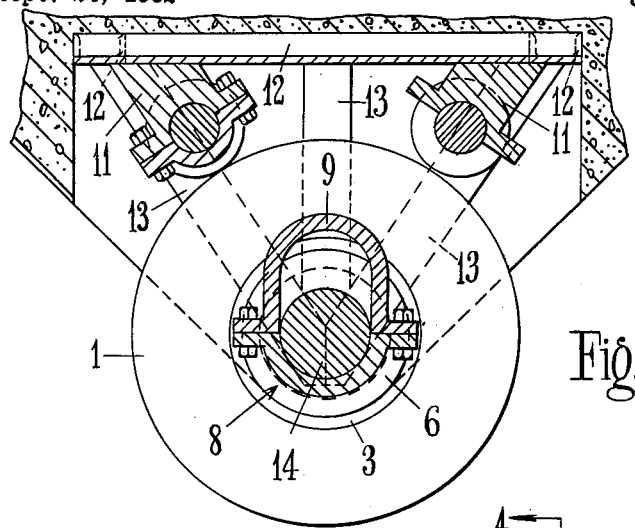
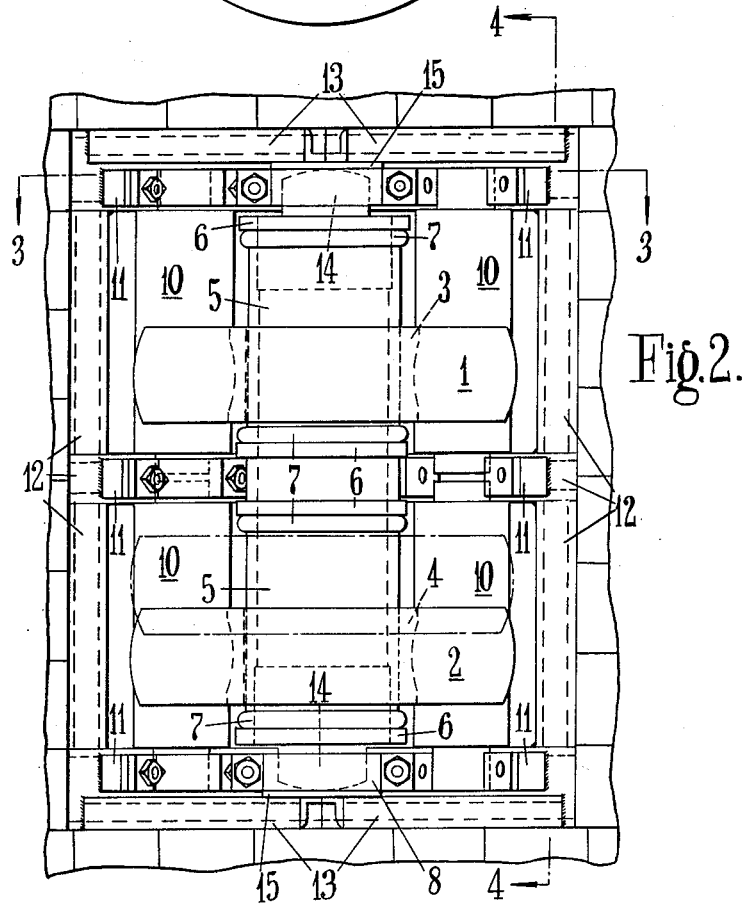

Oct. 8, 1963  B. G. S. B. BURLEIGH  3,106,182
FENDER
Filed Sept. 24, 1962  3 Sheets-Sheet 3
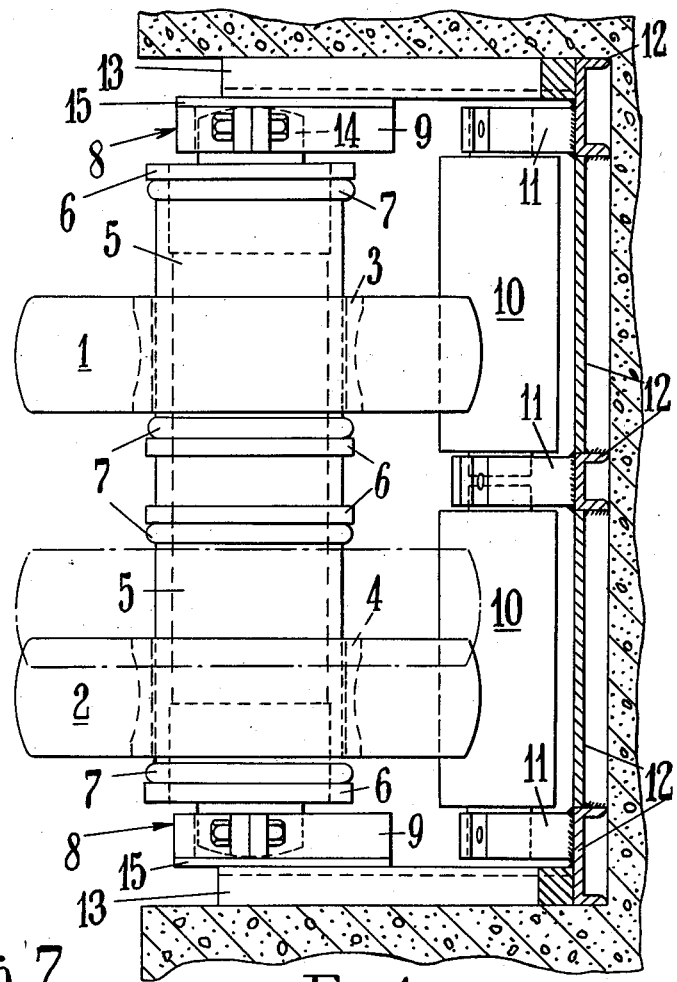
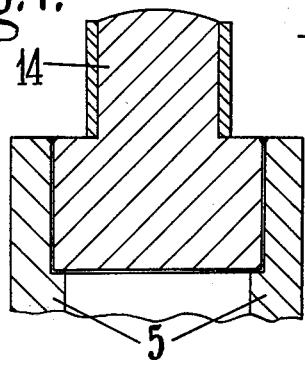
Fig. 7.
Fig. 4.
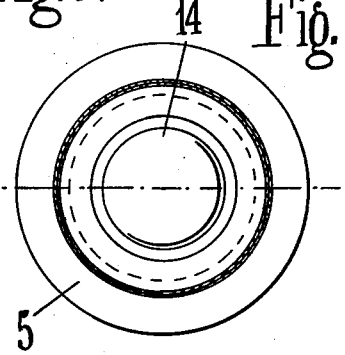
Fig. 6.

United States Patent Office 3,106,182
Patented Oct. 8, 1963

3,106,182
FENDER
Bertie George Star Bennet Burleigh, London, England, assignor to Firestone Burleigh Marine Pneumatic Fendering Co. Limited, Brentford, England
Filed Sept. 24, 1962, Ser. No. 225,537
Claims priority, application Great Britain Oct. 17, 1961
9 Claims. (Cl. 114—220)

This invention relates to fenders for use between vessels and quays to prevent damage to either due to movement of the vessels, and is an improvement in or modification of the invention described and claimed in my co-pending application No. 77,712 comprising a fender of the kind comprising a spar upon which are coaxially mounted a plurality of flexible ring-like members characterised in that the latter are separated from one another longitudinally of the spar and are mounted for rotation independently of each other about the axis of the spar.

The object of the present invention is to provide a fender which is adapted to be mounted upon a quay or pier or any fixed or floating structure which is simple in construction and yet will withstand considerable loads while being adequately resilient and which will adjust itself readily to varying conditions.

The invention consists in a fender comprising an axle having mounted thereon one or more rotatable flexible ring-like members, mounting means for the axle including load resisting means positioned upon the opposite side of the axle to that from which the load to be resisted by the fender is normally received, the mounting means being adapted to allow transverse movement of the axle, whereby, with flexing of the ring-like member or members under load, the whole of the load is resisted by the load resisting means.

The invention further consists in a fender as set forth in the preceding paragraph in which the ring-like member or members are inflated pneumatic tyres or tyre-like members, mounted upon the axle so as to be movable axially, while the load resisting means is roller means.

The invention still further consists in a fender as set forth in the preceding paragraph in which the mounting means comprises a metal framework adapted to be attached to a quay, pier or other structure and having bracket means thereon having bearings for the load resisting means.

The accompanying drawing shows by way of example only one embodiment of the invention in which:

FIGURE 2 is a front elevation of the fender;

FIGURE 3 is a plan view on the line 3—3 of FIGURE 2;

FIGURE 4 is a part section part elevation on the line 4—4 of FIGURE 2;

FIGURE 5 is a plan view of the top supporting bracket; while

FIGURES 6 and 7 are end elevation and part longitudinal section of the axle for the ring-like members.

Figure 1:
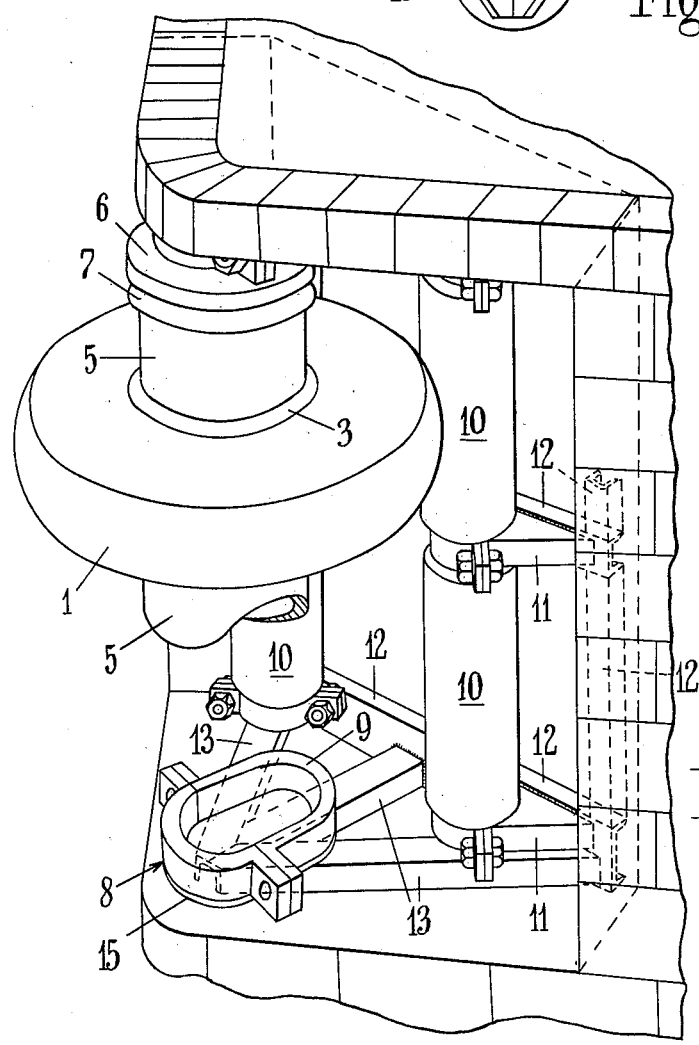
FIGURE 1 is a perspective view of the fender having two ring-like members, the lower ring-like member being omitted for the sake of clarity.

From FIGURES 1 and 2 it can be seen that the fender, in this embodiment of the invention comprises a pair of pneumatic tyres 1 and 2 each supported in hubs 3 and 4 so as to be easily rotatable about the axle 5 and are spaced apart by the central stop rings 6 and yet are capable of moving longitudinally upon the sleeves upon the axle either together or separately. It is preferred to provide rubber buffer rings 7 to cushion the contact with the stop rings 6.

The freedom of the tyres to run separately and move longitudinally of the axle allows a ship in contact therewith to roll and pitch without abrading the surface of the tyres with consequent rapid wear to the latter.

In order that the heavy load imparted to the tyres should not have to be resisted by the bearings of the axle, the bearings members 8 have elongated recesses bounded by element 9 which form a guide for the ends 14 of the axle, which allow the inner side of each tyre to rest upon a pair of rollers 10 mounted in bearings upon brackets 11 recessed in the supporting structure.

The brackets 11 are welded to a rectangular steel frame 12 which, in this embodiment, is shown fitted in a recess in a corner of a quay, the purpose of the fender being to prevent damage to a vessel by the quay and vice versa.

Figure 5:
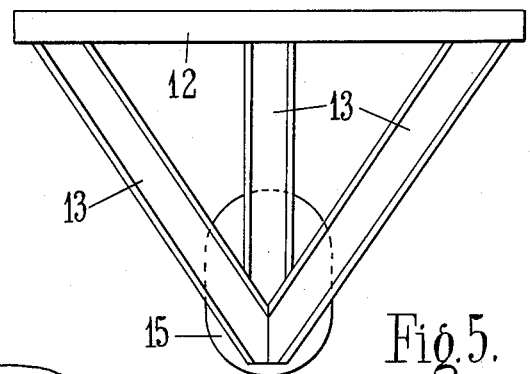

Also welded to the rectangular frame 12 is a top axle supporting triangular frame 13, shown in FIGURE 5, and a similar frame at the bottom, the elongated bearing members 9 being welded thereto.

FIGURES 6 and 7 show that the ends of the hollow axle 5 are closed by the end members 14 which are of reduced diameter and take end thrust upon a cover plate 15 (see FIGURE 1) upon a part spherical end to reduce friction.

The construction above described comprises a vertically disposed axle supporting a pair of ring-like members which are capable of independent rotation, are capable of moving bodily longitudinally of the axle, also independently of one another and can move towards and away from the load receiving rollers, whereby the axle bearings are relieved of load and the position is adjusted depending upon the load. Thereby, at the point of contact of a vessel with the periphery of the ring-like member movement is possible having directions which contain components which are at right angles to one another and therefore movement of the vessel in relation to the structure to which the fender is attached is possible, within the limitations imposed by the dimensions of the fender, without relative movement between the vessel and the ring-like member, whereby abrasion of the latter is avoided.

It can be clearly seen from the above that the axle can be mounted either vertically or horizontally or at an angle therebetween as is convenient and also that each fender can be provided with either only one ring-like member or with two or more such members. Furthermore, although the construction illustrated is particularly adapted to be positioned at an external angle in a quay, the invention can equally well be embodied in fenders adapted to be fitted in recesses in straight portions of quays, piers, docks, jetties, harbours, oil rigs, floating piers and so on in single or multiple arrangements while other details for carrying the invention into effect may be varied without departing from the scope of the invention claimed.

I claim:

1. A ship fender comprising an axle, at least one rotatable flexible ring-like member mounted on said axle, mounting means for the axle including a frame, a load resisting means including at least one roller rotatably mounted on the frame and on the side of the axle opposite to that from which the load to be resisted by the fender is normally received, the mounting means for said axle including guide means to provide for movement of the axle toward said load resisting element, whereby, with flexing of the ring-like member under load, the load is resisted by the load resisting means.

2. A fender as claimed in claim 1, in which the ring-like member is an inflated pneumatic tire-like member, mounted upon the axle so as to be movable axially.

3. A fender as claimed in claim 1, in which the mounting means comprises a metal framework adapted to be attached to a quay or other structure and includes bracket means thereon to receive the ends of the axle, and bracket means thereon for the load resisting means.

4. A fender as claimed in claim 3, in which the bracket means for the ends of the axle include elongated recesses for guiding the ends of the axle.

5. A fender as claimed in claim 2, in which there are two tire-like members each mounted upon a sleeve on the axle for limited axial movement, the axle being provided with stop rings at the ends thereof and intermediate of the ends to limit axial movement of said tire-like members and keep the said members separated from one another when in their closest position.

6. A fender as claimed in claim 5, in which rubber buffer rings are provided adjacent said stop rings.

7. A marine fender comprising a support member to be attached to a dock wall or the like, an axle, guide means on the support member for the ends of the axle to allow bodily movement of the axle transversely of its axis towards and away from said dock wall, at least one hub upon the axle, a flexible ring-like member upon the hub, at least one load resisting member rotatable about an axis parallel to the axis of the axle, said load resisting member being located on the opposite side of the flexible ring-like member to that from which the fender is approached by a ship, and at such distance from the axle as will allow the flexible ring-like member to bear upon the load resisting member and transfer the load thereto when the flexible ring-like member is loaded by contact with the side of a ship.

8. A marine fender comprising a support frame adapted to be secured to a dock wall, a rotatable axle, guide means on the support frame for the ends of the axle each comprising an elongated recess in said support frame which allows bodily movement of the axle transversely of its axis towards and away from said dock wall, at least two hubs upon the axle which are free to rotate independently of each other and to slide a limited distance longitudinally of the axle, an inflated pneumatic tire upon each hub, at least one load resisting roller for each tire rotatable about an axis parallel to the axis of the axle, and bearings for each load resisting roller mounted on the support frame on the side of the axle opposite to that from which the fender is approached by a ship, and at such distance from the axle as will allow the tires to bear upon the rollers and transfer the load thereto when the tires are loaded by contact with the side of a ship.

9. A marine fender comprising a support frame to be secured to a structure such as a dock wall, a hollow axle closed by end members of less diameter than the axle, bearing members on the support frame for the end members of the axle comprising an elongated recess in said support frame which allows bodily movement of the axle transversely of its axis towards and away from said support frame, two hubs upon the axle which are free to rotate independently of each other and to slide longitudinally of the axle, stop rings upon the axle at the ends thereof and between the hubs, a rubber buffer ring upon the axle adjacent each stop ring, an inflated pneumatic tire upon each hub, two load resisting rollers for each tire rotatable about an axis parallel to the axis of the axle, and bearings for each roller, brackets mounted on the support frame on the opposite side of the tires to that from which the fender is approached by a ship to support said bearings for each roller to support said rollers at such distance from the axle as will allow each tire to bear upon the rollers and transfer the load to said rollers when the tires are loaded by contact with the side of a ship.

References Cited in the file of this patent
UNITED STATES PATENTS

| | | |
|---|---|---|
| 807,959 | Padovani | Dec. 19, 1905 |
| 1,781,403 | Lyons | Nov. 11, 1930 |
| 2,731,678 | Hopkins | Jan. 24, 1956 |
| 2,952,979 | Rolando | Sept. 20, 1960 |

FOREIGN PATENTS

| | | |
|---|---|---|
| 627,915 | Great Britain | Aug. 18, 1949 |
| 1,149,026 | France | July 1, 1957 |